US005512352A

United States Patent [19]

Haig

[11] Patent Number: 5,512,352

[45] **Date of Patent: *Apr. 30, 1996**

[54] SMALL CYLINDRICAL ARTICLE HAVING FILM WRAP COVERING WITH SOLVENT SEAL BOND

[75] Inventor: Varjian Haig, Englewood Cliff, N.J.

[73] Assignee: CMS Gilbreth Packaging Systems, Inc., Trevose, Pa.

[ * ] Notice: The term of this patent shall not extend beyond the expiration date of Pat. No. 5,516,576.

[21] Appl. No.: 434,937

[22] Filed: May 4, 1995

Related U.S. Application Data

[60] Continuation of Ser. No. 259,497, Jun. 14, 1994, which is a division of Ser. No. 906,573, Jun. 30, 1992, Pat. No. 5,350,482.

[51] Int. Cl.[6] .......... B32B 3/00

[52] U.S. Cl. .......... 428/195; 428/40; 428/42; 428/908; 283/81; 156/86; 429/167; 429/176

[58] Field of Search .......... 428/40, 42, 174, 428/195, 343, 346, 187, 332, 908, 913, 914, 411.1; 283/84; 156/86; 429/167, 176

[56] References Cited

U.S. PATENT DOCUMENTS

| | | | |
|---|---|---|---|
| 2,703,660 | 3/1955 | Von Hofe et al. | 216/55 |
| 3,006,317 | 10/1961 | Showalter | 118/212 |
| 3,235,433 | 2/1966 | Cvacho et al. | 156/229 |
| 3,559,572 | 2/1971 | Hackley | 101/350 |
| 3,577,293 | 5/1971 | Ritterhoff | 156/156 |
| 3,604,584 | 9/1971 | Shank, Jr. | 215/12 |
| 3,630,783 | 12/1971 | Przybyla . | |
| 3,647,525 | 3/1972 | Dahlgren | 117/111 |
| 3,659,394 | 5/1972 | Hartleib et al. | 33/33 |
| 3,765,991 | 10/1973 | Hoffman | 156/521 |
| 3,834,963 | 9/1974 | Hoffman | 156/245 |
| 3,878,960 | 4/1975 | Jonsson et al. | 215/12 |
| 4,102,302 | 7/1978 | Amberg et al. | 118/239 |

(List continued on next page.)

FOREIGN PATENT DOCUMENTS

| | | |
|---|---|---|
| 1012906 | 6/1977 | Canada . |
| 0375538 | 12/1989 | European Pat. Off. . |
| 8803874 | 6/1988 | Germany . |
| 1106653 | 3/1968 | United Kingdom . |

OTHER PUBLICATIONS

Tampoprint Brochure on Tampoprinting Machines, pp. 1–26, Oct. 1987.

*Primary Examiner*—Patrick J. Ryan
*Assistant Examiner*—William A. Krynski
*Attorney, Agent, or Firm*—Morgan & Finnegan

[57] ABSTRACT

An apparatus and method for applying labels onto small cylindrical articles such as dry cell batteries is disclosed. A label transport drum has a substantially smooth surface. Cut labels are applied to the surface and an adhesive applicator applies a preferred cold adhesive onto an area adjacent the leading edge of the label. A solvent applicator applies a predetermined amount of solvent on the area adjacent the trailing edge of the label. The solvent applicator includes a solvent transfer roll and a rotatably support rotary pad print head. The rotary pad print head includes at least one narrowly tapering, flexible wiper tip. In one embodiment the wiper tip has a V-notch on its end. The flexible tip engages the solvent transfer roll, transferring solvent from the solvent transfer roll into the V-notch. The rotary pad print head is timed to rotate so that the flexible tip is deflected against the area adjacent the trailing edge of the label. Solvent contained within the V-notch is evenly applied onto the label. An article conveying mechanism present cylindrical articles into tangential spinning engagement with the drum and into rotative engagement with the adhesive whereby the label is transferred onto the article as the label is moved into engagement with the rotating article. In another embodiment, the flexible tip is tapered preferably without a V-notch. The slower speed of the wiper relative to the drum causes even application of the solvent onto the label. A servomotor and encoder provide speed control to ensure that the surface speed of the rotary pad print head is slower than the surface speed of the label transport drum.

6 Claims, 11 Drawing Sheets

U.S. PATENT DOCUMENTS

| | | | |
|---|---|---|---|
| 4,108,709 | 8/1978 | Hoffman | 156/446 |
| 4,108,710 | 8/1978 | Hoffmann | 156/450 |
| 4,108,711 | 8/1978 | Hoffmann | 156/497 |
| 4,124,433 | 11/1978 | Herdzina et al. | 156/456 |
| 4,207,832 | 6/1980 | Bowman et al. | 118/212 |
| 4,242,167 | 12/1980 | Hoffmann | 156/357 |
| 4,323,416 | 4/1982 | Malthouse et al. | 156/521 |
| 4,336,095 | 6/1982 | Hoffman | 156/361 |
| 4,366,016 | 12/1982 | Golden, Jr. | 156/210 |
| 4,406,721 | 9/1983 | Hoffman | 156/86 |
| 4,416,714 | 11/1983 | Hoffmann | 156/186 |
| 4,425,866 | 1/1984 | Hoffmann | 118/58 |
| 4,443,285 | 4/1984 | Roth et al. | 156/215 |
| 4,447,280 | 5/1984 | Malthouse | 156/85 |
| 4,496,409 | 1/1985 | Kontz | 156/83 |
| 4,500,386 | 2/1985 | Hoffmann | 156/449 |
| 4,511,416 | 4/1985 | Karpiloff . | |
| 4,526,645 | 7/1985 | Malthouse et al. | 156/350 |
| 4,544,431 | 10/1985 | King | 156/256 |
| 4,545,832 | 10/1985 | Hoffman | 156/86 |
| 4,561,928 | 12/1985 | Malthouse | 156/497 |
| 4,574,020 | 3/1986 | Fosnaught | 156/82 |
| 4,604,154 | 8/1986 | Fosnaught | 156/264 |
| 4,608,323 | 8/1986 | Zaborney . | |
| 4,632,721 | 12/1986 | Hoffman et al. | 156/458 |
| 4,642,150 | 2/1987 | Stemmler | 156/164 |
| 4,658,568 | 4/1987 | Reid et al. | 53/410 |
| 4,662,925 | 5/1987 | Thimons et al. | 65/104 |
| 4,671,836 | 6/1987 | Fumei | 156/215 |
| 4,686,931 | 8/1987 | DiFrank et al. | 118/50 |
| 4,693,210 | 9/1987 | DiFrank | 118/269 |
| 4,694,633 | 9/1987 | Fujio et al. | 53/49 |
| 4,703,715 | 11/1987 | Scheffer | 118/203 |
| 4,704,173 | 11/1987 | Hoffman | 156/86 |
| 4,724,037 | 2/1988 | Olsen | 156/520 |
| 4,726,872 | 2/1988 | Olsen | 156/488 |
| 4,729,811 | 3/1988 | DiFrank | 156/448 |
| 4,735,668 | 4/1988 | Hoffmann et al. | 156/215 |
| 4,749,428 | 6/1988 | Dickey | 156/215 |
| 4,761,200 | 8/1988 | Szeremeta | 156/448 |
| 4,772,354 | 9/1988 | Olsen et al. | 156/528 |
| 4,781,785 | 11/1988 | Szeremeta | 156/448 |
| 4,832,774 | 5/1989 | Difrank et al. | 156/215 |
| 4,844,760 | 7/1989 | Dickey | 156/215 |
| 4,844,957 | 7/1989 | Hoffmann | 428/347 |
| 4,911,994 | 3/1990 | Will et al. | 429/167 |
| 4,923,557 | 5/1990 | Dickey | 156/86 |
| 4,929,312 | 5/1990 | Westcott | 203/2 |
| 4,931,122 | 6/1990 | Mitchell | 156/215 |
| 4,971,197 | 11/1990 | Worley | 206/333 |
| 4,977,002 | 12/1990 | Hoffmann | 428/34 |
| 4,983,238 | 1/1991 | Yoshida et al. | 156/86 |
| 4,984,413 | 1/1991 | Cosmo | 53/468 |
| 5,032,477 | 7/1991 | Will et al. . | |
| 5,037,499 | 8/1991 | Bright et al. | 156/456 |
| 5,045,140 | 9/1991 | Dickey | 156/215 |
| 5,059,895 | 10/1991 | Cataldi et al. . | |
| 5,078,817 | 1/1992 | Takagaki | 156/73.1 |
| 5,078,826 | 1/1992 | Rogall | 156/421 |
| 5,091,040 | 2/1992 | Otruba | 156/366 |
| 5,091,239 | 2/1992 | Przeworski et al. | 156/145 |
| 5,116,452 | 5/1992 | Eder | 156/564 |
| 5,174,851 | 12/1992 | Zodrow et al. | 156/353 |
| 5,292,566 | 3/1994 | Shacklett, III | 428/40 |
| 5,312,712 | 5/1994 | Will et al. | 429/167 |
| 5,368,953 | 11/1994 | Zaborney et al. | 430/90 |

SMALL CYLINDRICAL ARTICLE HAVING FILM WRAP COVERING WITH SOLVENT SEAL BOND

This is a continuation of application Ser. No. 08/259,497, filed on Jun. 14, 1994, which is a divisional of application Ser. No. 07/906,573 filed Jun. 30, 1992, now U.S. Pat. No. 5,350,482.

FIELD OF THE INVENTION

This invention relates to an apparatus and method for applying labels onto cylindrical articles and more particularly to an apparatus and method for applying small, high quality thin film labels onto small cylindrical objects such as dry cell batteries by applying a preferably cold adhesive onto an area adjacent the leading edge of the label and a predetermined amount of solvent evenly applied onto the area adjacent the trailing edge of the label.

BACKGROUND OF THE INVENTION

Wrap-around labelling is commonly used in applying a label onto food and beverage containers, as well as other larger diameter containers. Examples of such technology include the apparatus and methods disclosed in U.S. Pat. No. 4,844,760 to Dickey; U.S. Pat. No. 5,091,239 to Przeworski et at.; U.S. Pat. No. 4,735,668 to Hoffmann et at.; U.S. Pat. No. 4,632,721 to Hoffmann et at.; U.S. Pat. No. 4,761,200 to Szeremeta; U.S. Pat. No. 4,724,037 to Olsen; U.S. Pat. No. 4,832,774 to DiFrank et at.; U.S. Pat. No. 4,686,931 to DiFrank et at.; U.S. Pat. No. 4,416,714 to Hoffmann.

The foregoing apparatus and methods disclosed in the above patents typically cannot be used for high quality cylindrical labeling of thin film labels onto small articles, e.g., dry cell batteries, lipstick containers, or lip balm containers for several reasons as follows:

1. Many of the label transport drums, such as disclosed in the '668, '721 and '760 patents include raised portions positioned on the surface of the drum, typically vacuum or other label retaining means, that inhibit smooth transfer of a smaller label onto a smaller cylindrical article such as a dry cell battery.

2. High quality thin film labels require aesthetic seams produced from a predetermined amount of solvent typically applied to the area adjacent the trailing edge of the label moving on the label transport drum to form a high quality, aesthetic seal at the juncture between overlapping leading and trailing edges. Usually the applied label has three areas adjacent the edge portion substantially free of printed matter and ink providing an area for receiving solvent thereon. These areas are free of ink to prevent distortion of graphics. The more conventional solvent application means such as the direct printing by gravure roll disclosed in the '200, '037, and '210 patents, would not provide an even coat of solvent onto the label. Typically the applied solvent would have a more mottled solvent pattern, forming a low quality seam.

3. Typically an adhesive is applied to the area adjacent the leading edge to form an initial tack weld of the label to the article. Often a hot melt adhesive is used, being solid at room temperature, and viscous at elevated temperatures. If applied to thin label material used with smaller articles, e.g., dry cell batteries, it is believed that the label would distort, causing poor label quality on aesthetic seams once applied.

4. Conventional static wiping of solvent onto a label, such as disclosed in the '760 patent, usually smears the solvent, creating a poor aesthetic seam. Static wiping of solvent is useful with larger articles commonly having opaque labels that hide the seam. However, for the more demanding label applications, such as labeling dry cell batteries, the foregoing solvent application systems are inadequate.

As a result of the foregoing drawbacks described above, high quality cylindrical labeling of small cylindrical articles with thin film labels has heretofore required the use of pre-seamed sleeves formed on a continuous basis and applied directly to the article. The use of pre-seamed sleeves is both slow, inefficient, expensive, and distorts graphics, as compared to the more desired wrap-around labeling technology.

It is therefore more desirable to use wrap-around labeling methods and apparatus to transfer small labels directly onto small cylindrical articles.

OBJECTS OF THE INVENTION

It is therefore an object of the present invention to provide an apparatus and method for applying thin film labels onto small cylindrical articles that form seams of high quality between leading and trailing edges.

It is another object of the present invention to provide an apparatus and method for applying labels onto small cylindrical articles without smearing the solvent applied onto the area adjacent the trailing edge of the label.

It is another object of the present invention to provide a solvent applicator that evenly applies a solvent to a thin film label material in a pattern without smearing or mottling of the solvent on the label.

It is another object of the present invention to provide an article to which a thin film label having a thickness less than 0.0035 inches has been circumferentially applied thereto and in which the label is secured to the cylinder by an adhesive on the area adjacent the leading edge and on the overlapping trailing edge by an evenly applied solvent.

It is another object of the present invention to provide a dry cell battery having a thin film label material applied thereto in which the label is secured adjacent the leading edge by an adhesive and on the overlapping trailing edge by an evenly applied pattern of solvent.

Additional objects and advantages of the invention will be set forth in the description which follows and, in part, will be obvious from the description and advantages being realized and attained by means of instrumentation, facts, apparatus, systems, steps and procedures, particularly pointed out in the specification.

BRIEF DESCRIPTION OF THE INVENTION

In accordance with the present invention, labels formed from light weight, thin polymeric sheet material are applied to small cylindrical articles while obtaining well-defined, high quality seams between overlapping leading and trailing edges of the label. Typically, the areas adjacent the leading and trailing edges of the label do not include ink or other printed matter because these areas receive a solvent. As a result, any streaking or unevenly applied solvent forming a mottled appearance would be apparent immediately.

The present invention now provides for high quality cylindrical labeling of small articles such as dry cell batteries using thin film labels, e.g., typically less than 0.0035 inch. Pre-seamed sleeves formed on a continuous basis no longer are necessary for use with these small cylindrical articles to obtain high quality cylindrical labeling.

The present invention provides new and surprising results in high quality cylindrical labeling by the use of a flexible wiper tip deflected against the label to apply a pattern of solvent to the label, preferably in an area adjacent the trailing edge of the label. The wiper tip is mounted on a rotatable wiper member, and protrudes outwardly therefrom. The solvent is held captive on the edge of the flexible wiper tip by the minimal surface tension of the solvent. The nature of the resilient, narrowly ropering tip, together with tip deflection against the label, evenly applied solvent onto the area adjacent the trailing edge of the label without 1) solvent smearing attendant static wiping and 2) the uneven and mottled solvent pattern attendant direct solvent printing onto the label such as by a gravure roll.

In one embodiment the tapering wiper tip includes a V-notch for holding solvent. As the wiper tip engages the label solvent, it is transferred evenly from the wiper tip to a label. In another embodiment without the V-notch, a predetermined amount of solvent may still be evenly applied on an area of the label when the surface speed of the tip is slower than the surface speed of the label and drum. The combination of the deflection of the wiper tip against the label, as well as the speed differential between the surface speeds of the wiper tip and label transport drum, evenly applying solvent adjacent the trailing edge of the label without solvent smearing and mottling.

In accordance with the present invention, the apparatus includes a label transport drum having a substantially smooth surface. As compared to other prior art label transport drums having label retaining means incorporating raised portions on the drum surface to facilitate leading and/or trailing edge adhesive and solvent application, the label transport drum of the present invention has a smooth surface. The smooth drum surface is more desirable with high quality cylindrical labeling of small articles to ensure that transfer of the smaller and thinner labels onto a small article is smooth and uninterrupted. The label transport drum still preferably includes means for retaining the label to the drum surface, such as a vacuum system; however, the retaining means is not outwardly extending from the drum surface as in prior art apparatus.

After a label is fed to the surface of the label transport drum, an adhesive applicator applies a preferably cold adhesive onto an area adjacent the leading edge of the label while the label moves with the rotating drum. A cold adhesive is preferred to resist the tendency for other adhesives commonly used in prior art such as hot melts, to distort or crease the thin film upon application.

A solvent applicator then applies a predetermined amount of solvent onto an area adjacent the trailing edge of the label. The solvent applicator comprises a solvent transfer roll and a rotating, wiper member having at least one outwardly extending and tapering, flexible wiper tip. The flexible wiper tip preferably is formed from urethane. Additionally the wiper tip may be formed from silicone. The solvent transfer roll and wiper member rotate synchronously with each other and are positioned adjacent to each other so that the flexible tip engages the solvent transfer roll as both rotate, transferring solvent from the solvent transfer roll into the V-notch. In the preferred embodiment, the wiper member in a formed as a rotary pad print head. The solvent transfer roll is preferably a gravure roll having a plurality of indentations of predetermined depth and volume for transferring solvent to the wiper tip. The V-notch opening can range from 0.010 to 0.030 inches dependent upon the required seam width.

In the embodiment having a narrowly tapering, flexible tip with a V-notch on the end portion, solvent is received into the V-notch and held therein by the minimal solvent surface tension. The solvent is transferred from the V-notch to the area adjacent the trailing edge of the label during synchronous rotation of both the rotary pad print head supporting the wiper member and the label transport drum.

In another embodiment, the flexible tip member does not include a V-notch for receiving solvent therein. The tip in this embodiment typically is more narrow, for example about 0.010 inches thick, and the rotary pad print head rotates at a surface speed slightly slower than the surface speed of the label transport drum. The resultant tip deflection and the difference in surface speed between the wiper tip and label moving with the drum provides for even wiping of solvent from the tip against the area adjacent the trailing edge of the label without having smearing or mottling of solvent. The solvent is evenly applied in a precise pattern, typically a rectangular pattern on the area adjacent the edge. In this embodiment, a servomotor and an encoder are operatively connected to the rotary pad print head and to the solvent transfer roll and are provided to control the speed differential between the rotary pad print head and the label transport drum.

An article conveying means in the form of an elevating conveyor, a serpentine gravity chute and timing wheel assembly conveys cylindrical articles into tangential spinning engagement with the drum and into rotative engagement with the adhesive positioned on the area adjacent the leading edge of the label. The label is transferred onto the article as the label is moved into engagement with the rotating article. During transfer, the trailing edge portion overlaps the leading edge portion and a seam of high quality is formed because the solvent is evenly applied in a pattern onto the area adjacent the trailing edge of the label.

The label preferably is formed from a heat shrinkable film such as formed from a vinyl or polyester composition. The solvent preferably is an organic solvent that chemically reacts to the label material. The label typically is formed from polymer material having areas adjacent the edge portions that are substantially free of printed matter and ink for providing an area adapted for receiving the solvent. The desired solvent varies depending on the label material; however, the solvent must be reactive to the label material.

The label is fed continuously as a strip. A rotary knife cuts the strip into labels of predetermined size. For example, a label used for covering AA batteries can be about two by two inches. The label is fed from a large roll of label strip material. In the preferred embodiment, at least two rolls of label strip material are provided. A dancer roll assembly receives the label strip material from a first roll. A rotary knife is positioned adjacent the drum for contacting and cutting the label moving on the drum. The surface of the drum includes hardened surface areas on which label cutting occurs. The hardened surface area is substantially coplanar with the other surface portions of the drum.

The solvent applicator of the present invention includes a closed solvent containing reservoir. A partially closed housing contains the gravure roll and rotary pad print head. A solvent distribution shoe is positioned without the housing. The shoe has an arcuate configured solvent delivery surface positioned substantially contiguous to the surface of the solvent transfer roll. A solvent metering pump delivers solvent from the reservoir to the solvent distribution shoe.

In one embodiment, the solvent distribution shoe comprises a substantially rigid block formed of a material such as Teflon. The block has an annulus extending therethrough. Solvent delivery means is positioned on the arcuate configured solvent delivery surface and communicates with the annulus. A threaded needle valve may be included within the orifice to meter the amount of solvent flowing through the metered orifice. A venturi vacuum pump draws the solvent vapors generated within the housing into the fluid reservoir, and also provides a vacuum head in the solvent reservoir providing scavenge means to draw surplus solvent back to the reservoir from the shoe.

The container conveying means comprises a two lane serpentine chute assembly and straight chain or belt conveyor which conveys articles parallel in two lanes to each other. The article conveying means conveys articles horizontally to the surface of the label transport drum at a position ahead of a label moving on the drum. The label moves faster than the article discharged onto the drum, resulting in the article contacting the adhesive adjacent the leading edge of the label. The article continues to rotate, and the label is wrapped around the article. The trailing edge portion overlaps the leading edge portion, and the solvent aids in adhering the two together to form a high quality seam. If necessary, the article then is fed by conveyor to a heating means where the label may be heat shrunk onto the article.

DESCRIPTION OF THE DRAWINGS

The foregoing and other objects and advantages of the present invention will be appreciated more fully from the following description, with references to the accompanying drawings in which.

Figure 12:
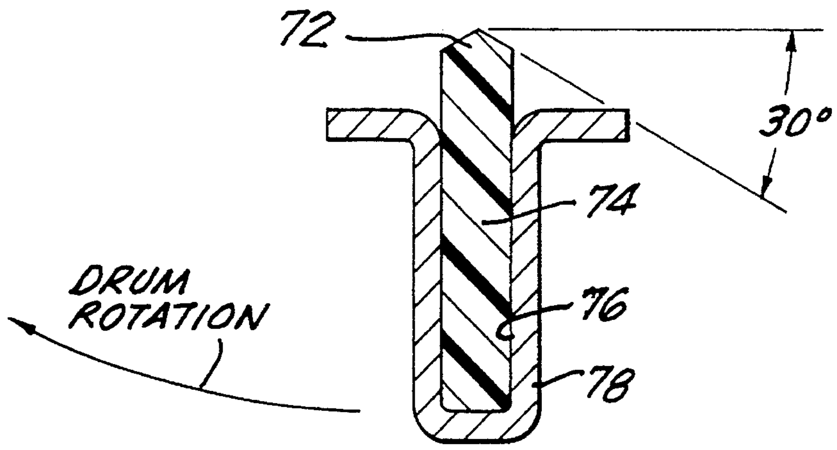
FIG. 12 is a sectional view of one embodiment of the flexible wiper tip of the wiper member supported by a support block of the rotary pad print head.
Figure 12A:
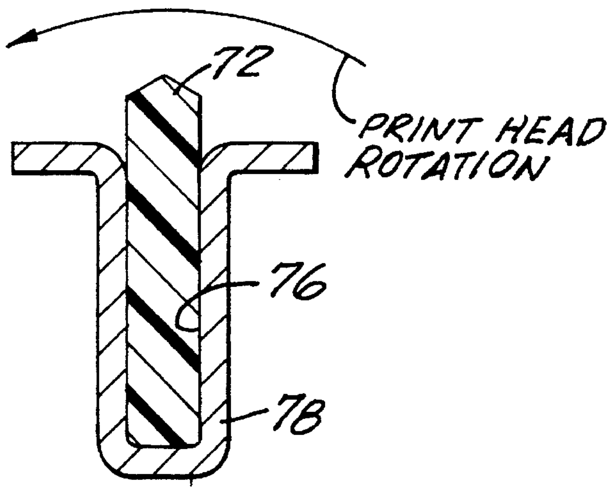
Figure 13:
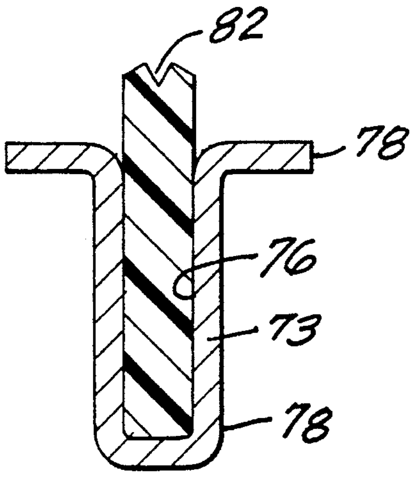
Figure 14:
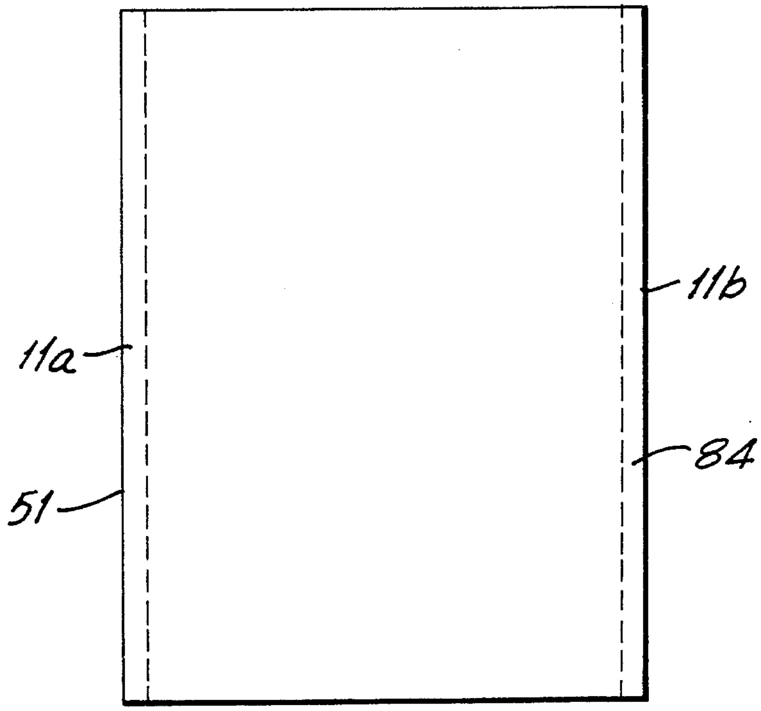
Figure 15:
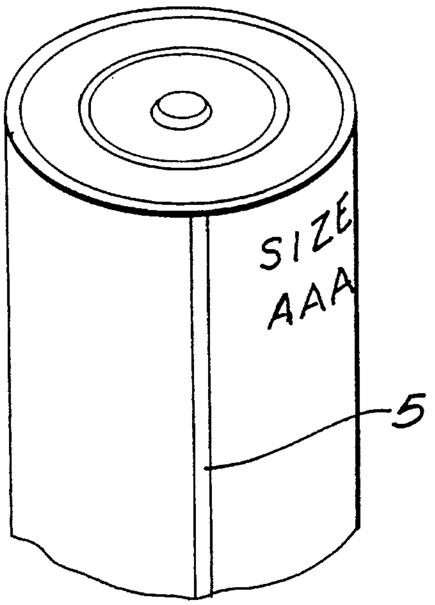
Figure 16:
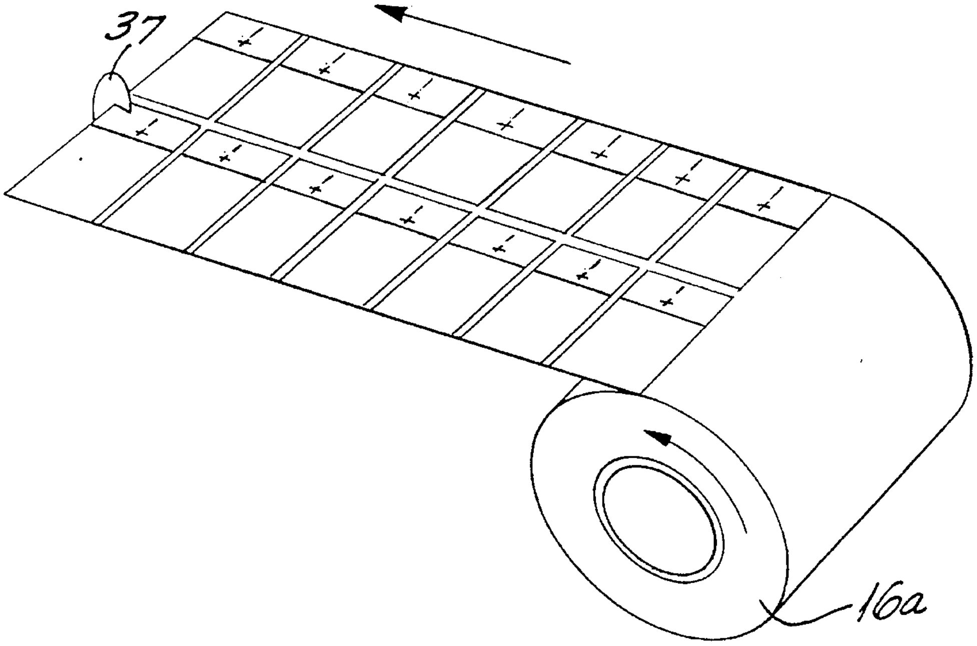
Figure 17:
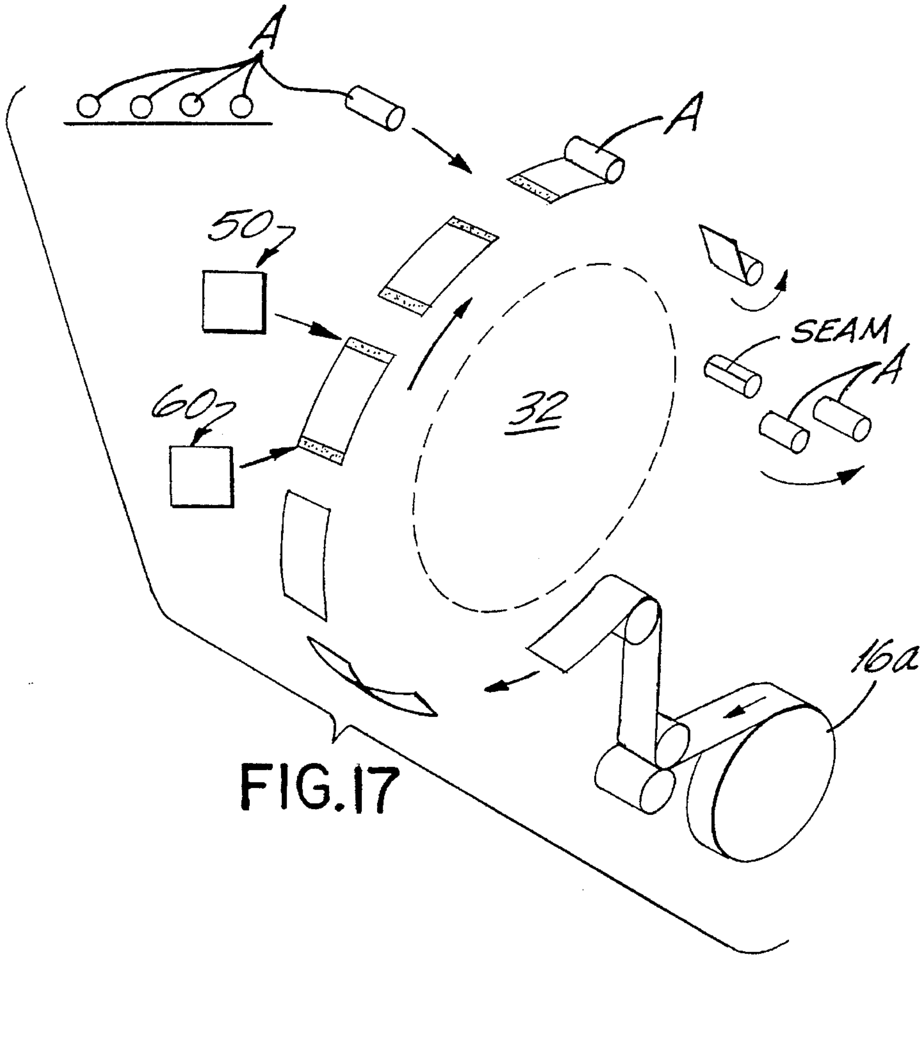

FIG. **12*a* is another view of the wiper tip of FIG. 12** showing partial tip deflection such as when the tip engages the surface of the label transport drum;

FIG. 13 is a sectional view of another embodiment of the flexible wiper tip having the V-notch;

FIG. 14 is a plan view of a label to be applied, showing leading and trailing edges and the areas adjacent such edges where the adhesives and solvents are applied;

FIG. 15 is an isometric view of a dry cell battery showing a high quality thin film label of the present invention applied thereto;

FIG. 16 is an isometric view of a dual printed roll of label having a strip of dry cell battery label material unwound therefrom; and FIG. 17 is a schematic, isometric view showing basic steps in cutting and labeling of an article.

DETAILED DESCRIPTION OF THE INVENTION

Figure 1:
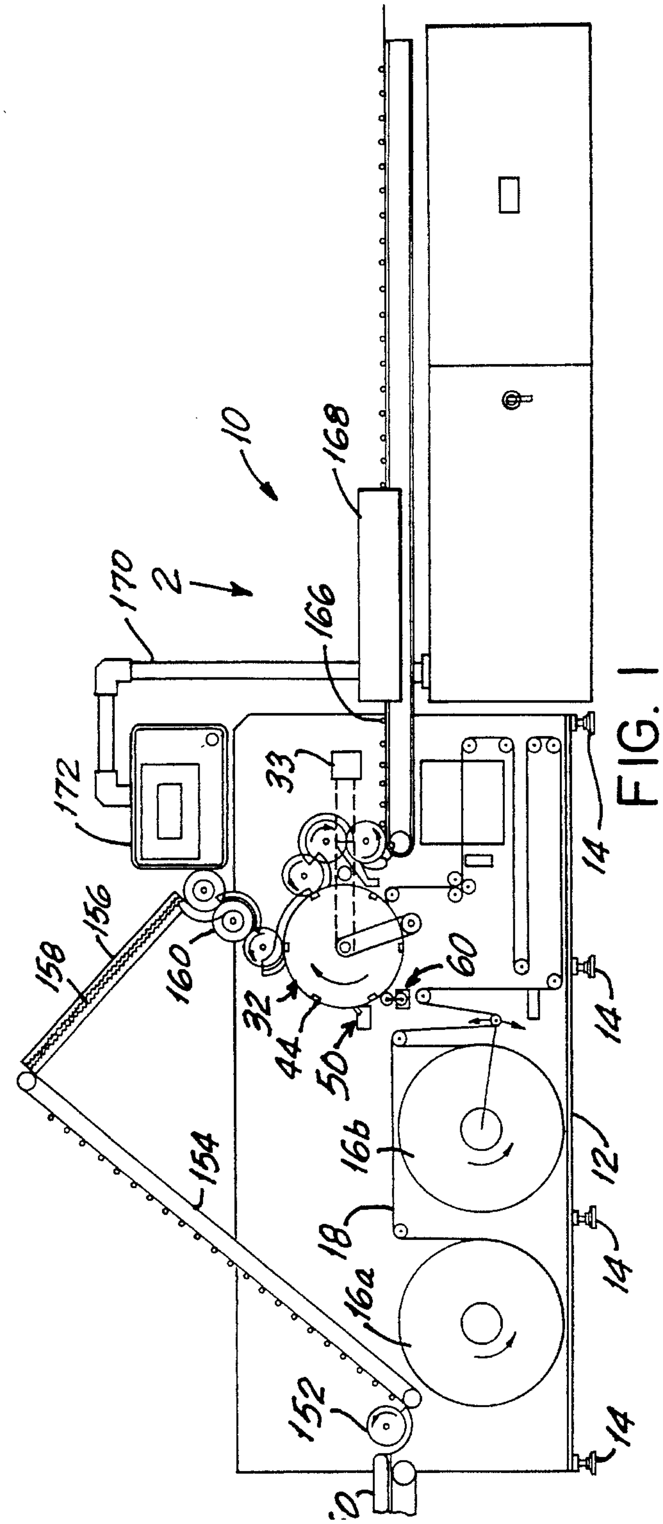
FIG. 1 is a schematic, side elevation view of the apparatus in accordance with the present invention.

Referring now to FIG. 1, there is illustrated at 10 one embodiment of the apparatus for applying a high quality thin film label to a cylindrical article while forming a seam of high quality. Throughout the description, the small cylindrical articles to be labeled will be referred to as articles A, and will be given the reference letter A. The apparatus 10 may be used with a large variety of articles, such as dry cell batteries, lip balm containers, lipstick tubes and other small articles demanding high quality labeling standards for the formed seam.

The apparatus of the present invention is suitable for high quality cylindrical labeling of small cylindrical articles such as dry cell batteries which demand the use of labels having a thickness typically less than 0.0035 inches. These thin film labels cannot be used with prior art apparatus and methods such as disclosed in Hoffmann and Dickey, U.S. Pat. Nos. 4,735,668 and 4,855,760 respectively, disclosing hot melt adhesive application onto the area adjacent the leading edge of a label. Such use of hot melt adhesives with these high quality thin film labels causes distortion of the label and causes a poor quality label once applied.

Additionally, the novel solvent applicator of the present invention is simple in construction, but shows surprising results of evenly applying and controllably spreading a predetermined amount of solvent on an area adjacent the trailing edge of a label without having uneven solvent application causing mottling or solvent streaking. The solvent applicator of the present invention is particularly advantageous over other prior art apparatus and methods using direct printing from gravure rolls or other rotary pad printers, such as disclosed in U.S. Pat. No. 4,761,200 to Szeremeta, in which the solvent for the plastic label is transferred from a gravure roll to areas of the label.

The applicator of the present invention also is advantageous over other prior art static wiping methods and apparatus, believed to cause solvent streaking and poor quality label seams, if those prior art methods and apparatus were used to label small cylindrical articles with high quality thin film labels, typically having a thickness less than 0.0035 inches.

In accordance with the present invention, the apparatus 10 includes a frame 12 for supporting major components such as a label transport drum, adhesive and solvent applicators, and rolls of continuous label material. The frame 12 includes leg supports 14 for supporting the frame on the floor. Two rolls **16*a*, 16*b* of label material are supported for rotation on the frame. The rolls 16*a*, 16*b*** may include drive motors (not shown) or other tensioning mechanisms for supplying tension to the rolls during withdrawal of film.

Figure 10:
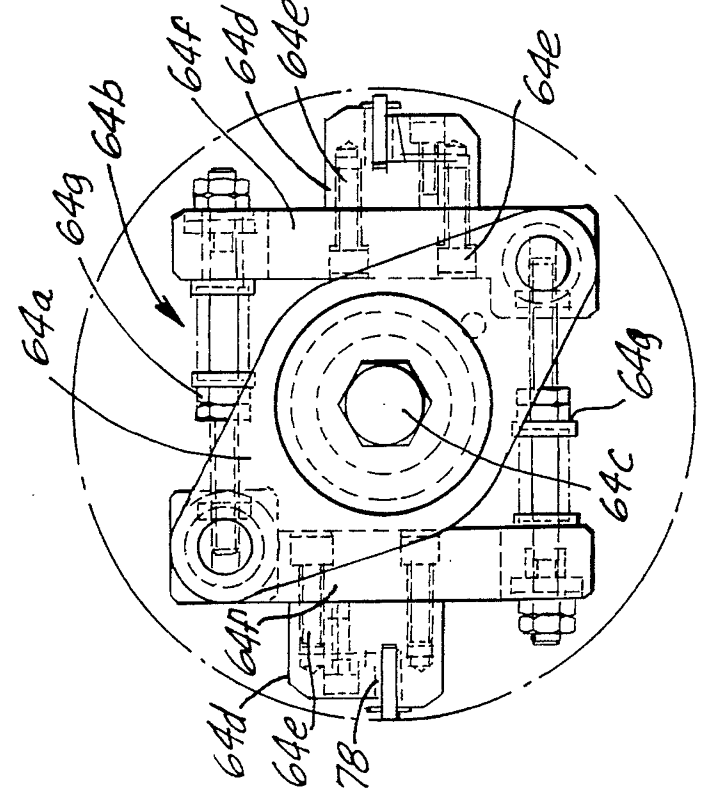
FIG. 10 is another detailed end view of the rotary pad print head.

The label material is pre-printed with identifying indicia used on the label to be transferred to the article A. Alternatively, a printing stamp or roller (not shown) may be positioned adjacent the label roll for printing directly onto the label material as it is withdrawn from the roll. In the preferred embodiment, each strip of label material has first and second continuous columns of printed indicia (FIG. 10). During labeling, the strip 18 is longitudinally slit by a conveniently positioned slitter knife, and then horizontally slit as will be explained later to form cut labels of predetermined size having exposed leading and trailing edges 11*a*, 11*b* respectively (FIG. 14). The present apparatus 10 is preferably designed for wrapping articles fed in parallel pairs to each other.

The label material is formed preferably from a heat shrinkable film material. Examples of acceptable film materials include those formed polyvinyl chloride, polyester, and polystyrene. As compared to other heat shrinkable film materials used for labeling larger containers, the present apparatus 10 may be advantageously used for high quality cylindrical labeling of small cylindrical articles with thin film labels requiring seams of high quality. Prior art labeling apparatus and methods were designed with larger articles in mind. Also, the labels applied to these larger articles often were opaque, hiding poor seams formed as a result of the labeling process.

The present invention is especially directed to use with label material having a thickness under 0.0035 inches, a thinner material thickness commonly used for labeling smaller cylindrical articles such as dry cell batteries. Typically, the articles are less than 1.75 inches in diameter. More conventional labeling methods possibly could be used successfully with larger diameter articles. Because of the demanding label and seam quality requirements necessary for labeling of some small articles such as dry cell batteries, the labels heretofore have been pre-seamed on a continuous basis, and then applied as a sleeve to the article. A typical article size in which a high quality label heretofore was applied as a sleeve ranged in size usually less than one inch diameter.

If smaller cylindrical articles requiring high quality labeling were to be used With wrap-around apparatus and methods, typically printed matter would be positioned on a major portion of the label, forming a substantially opaque label in the central portions. The edge portions adjacent leading and trailing edges, however, would typically be free of printed matter and ink. As a result, in a high speed labeling operation for use with smaller articles, e.g., dry cell batteries, the solvent must be evenly applied onto the area adjacent the trailing edge to prevent a poorly developed seam—there is no printed matter or ink to hide a poorly formed seam. The apparatus 10 of the present invention provides the surprising result of forming high quality label seams on small cylindrical articles which heretofore required labeling with pre-seamed sleeves.

As indicated in FIG. 1, label material is fed as a strip 18 from the first supply roll 16*a* (FIG. 1) into a dancer roll assembly indicated generally at 22, having a plurality of individual dancer rolls 24. The strip 18 passes over a registration sensor 26, registering the amount of label strip 18 withdrawn from the supply rolls 16*a*, 16*b*. An automatic splicer may be incorporated with the dancer roll assembly to splice one strip from the first roll into the other strip.

Figure 3:
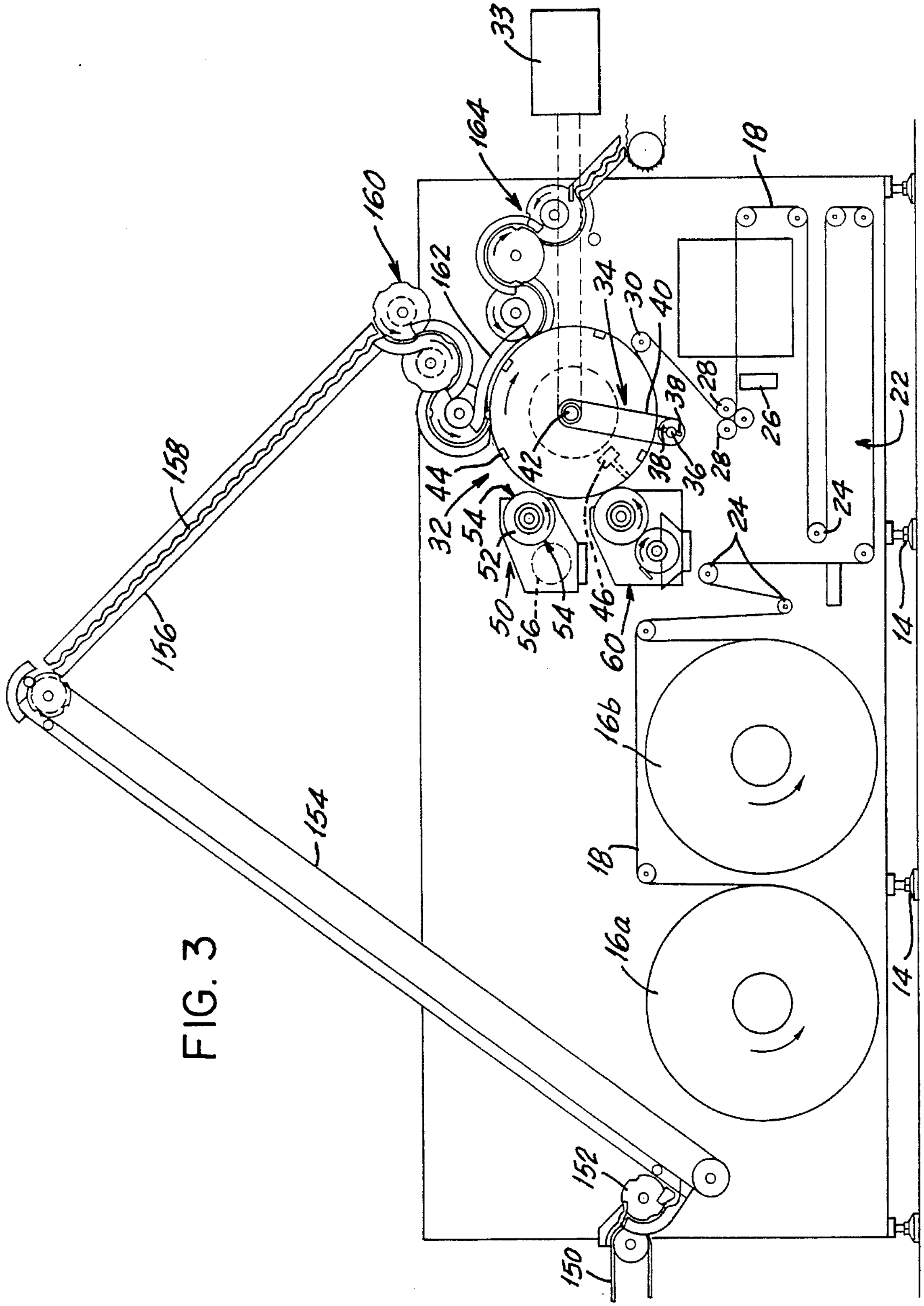
FIG. 3 is an enlarged side elevation view of the apparatus of FIG. 1.

The strip 18 passes through a pair of feed rolls 28 rotating upwardly and outwardly from each other to aid in pulling the strip through the dancer roll assembly 22. The strip 18 passes over an idler roll 30 and onto the label transport drum indicated generally at 32. Conventional drive motors on transmission 33 (FIG. 3) impart the force necessary for rotating the drum at a desired speed. As the label is received onto the label transport roll 32, it is cut by a rotating knife assembly shown generally at 34 (FIG. 3).

The rotating knife assembly 34 includes a knife support head 36 or other similar rotative member having opposing knife blades 38 mounted thereon. The knife support head 36 is rotatably supported on the frame 12. The opposing knife blades 38 rotate and engage the strip of label material in timed sequence to cut the strip at predetermined points as the label is fed to form a cut label of predetermined size. The knife head 36 is preferably rotated by means of a belt transmission 40 interconnecting the hub 42 of the label transport drum 32 and knife support head 36. Typically, when dual, parallel printed label indicia are used (FIG. 16), the knife support sprocket may include a slitting mechanism incorporated between the two blades as a continuous slitting blade for longitudinally slitting the strip before horizontal knife 37 (FIG. 16) cutting to form two parallel strips. At the point on the label transport drum 32 where the knife elements 38 contact the label, a hardened insert 44 is positioned. The hardened insert 44 can be formed of carbide or other material that withstands the forces generated by the knife blades 38.

The present apparatus 10 is also advantageous over other prior art labeling apparatus using a label transport drum because the label transport drum 32 of the present invention is smooth, and does not include pads or other label securing means that form bumps or other protrusions on the drum surface. Such bumps or protrusions inhibit smooth transfer of the label onto the article to be wrapped. It is believed that the transfer of smaller, and thinner labels over the bumps of prior art label transport drums may cause creasing of the label, forming a low quality seam and poorly labeled product. Such lower quality seams and lack of smooth label surface on the article is unacceptable for use on those smaller articles demanding high quality labeling, such as dry cell batteries, lip balms and lipstick containers.

The label transport drum 32 includes vacuum means 46 for retaining the cut label onto the label transport drum 32 as the drum 32 rotates. Only one vacuum means 46 is illustrated. However, a plurality of means 46 may be evenly spaced around the periphery of the drum 32. Although not illustrated in detail, the vacuum means 46 for retaining labels to the surface of the label transport drum is unique in design. The vacuum means 46 includes a vacuum and air distribution system with radial manifold timing into three radial manifolds. A vacuum is applied in a drag area to maintain vacuum through the applicator areas. A cutoff is provided as the article rolls over the label. Air is blown upward tangentially backward toward the article to release the vacuum and push the label toward the article. After the article is removed from the label transport drum 32, air blow-off occurs prior to entering the drag area again. This secondary blow-off provides means to eject any labels which may not have been transferred due to absence of articles or damage.

As the vacuum secured label continues on the rotating drum 32, the leading edge of the label advances to a position adjacent to an adhesive applicator indicated generally at 50. The adhesive applicator 50 applies preferably an adhesive to the area adjacent the leading edge 11*a* of the label (FIG. 14). The adhesive is applied into an area adjacent the edge, indicated at 51, the area preferably is small and fairly precise, substantially rectangular in configuration. A cold adhesive is more desirable than a hot melt adhesive because a hot melt adhesive such as disclosed in U.S. Pat. No. 4,735,668 would tend to distort the thin label material and form an adhesive joint of poor appearance and impair the quality of the subsequently formed seam. As used herein, the term cold adhesive is defined as those adhesives that are viscous at room temperature, as compared to conventional hot melt adhesives that are inherently solid at room temperature and become viscous only at elevated temperatures. Potential cold adhesives could be water or solvent based on adhesives with suspended solids, and potentially rubber-based solvent and latex adhesives.

Conventional adhesive applicators may be used in accordance with the present invention. In the embodiment of FIG. 3, a rotating pad printer head 52 has opposing adhesive wiper members 54. The pad printer 52 rotates and the wiper members 54 draw adhesive from an adhesive transfer roll 56, which could be a gravure roll, transferring adhesive from the roll 56 to the wiper members 54. The rotation of the pad printer head 52 is timed in synchronism with the label transport drum 32 to ensure that the wiper members 54 engage the area adjacent the leading edge of labels secured on the label transport drum 32.

After the cold adhesive is applied to the area adjacent the leading edge of the label, a solvent application system, indicated generally at 60, evenly applies solvent without mottling or solvent streaking in a precise pattern to the area adjacent the trailing edge of the label. The solvent reacts with the film material, softening the area adjacent the trailing edge to provide a tacky quality to that area, retaining the trailing edge to the leading edge in overlapping engagement when the label is circumferentially wrapped around the article. The solvent is applied after the adhesive is applied, to ensure that the solvent does not evaporate before the trailing label edge 11*b* has overlapped the leading edge 11*a*. The preferred solvent is an organic solvent and reacts to the film material.

Figure 5:
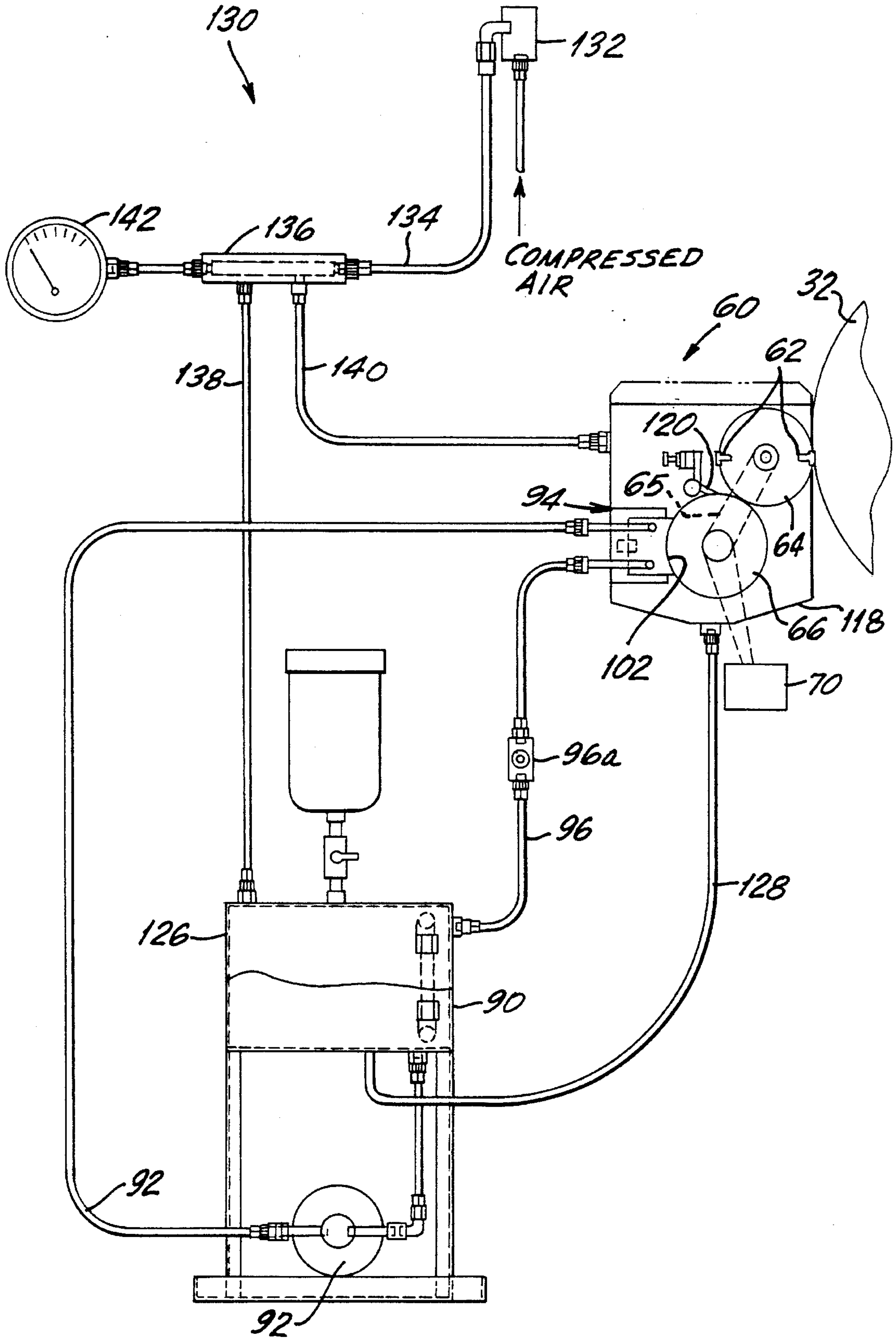
FIG. 5 is a schematic illustration of the solvent delivery system.

Referring now to FIGS. 5–13, details of the solvent application system 60 are illustrated. As shown in FIG. 5, the solvent application system 60 includes a wiper member 64 formed as a rotary pad print head 64. The rotary pad print head 64 is pivotally mounted by a bracket and mounting arm assembly, indicated by dotted lines at 65, to a solvent transfer roll in the form of a gravure roll 66 having a plurality of indentations 68 of predetermined volume. Solvent is held within the indentations and transferred to the wiper members 62 positioned on the rotary pad print head 64. A common drive mechanism indicated by dotted lines and block 70, interconnects by suitable transmission means (not shown in detail) both the gravure roller 66 and the rotary pad print head 64. The gravure roller 66 may be rotatably supported by mounting members to the frame 12 or other mounting support member.

In accordance with the present invention, the rotary pad print head 64 includes two outwardly extending, tapering, and narrowing flexible tips (FIGS. 12 and 13). The tips 72 are formed from a resilient material, which is not reactive to the solvent applied onto the area adjacent the trailing edge. The flexible tip 72 typically provides some resiliency to allow deflection of the tip against the label and drum surface, while retaining at least some stiffness to exert a wiping force against the label. The wiper material may have a varying shore hardness. It has been found that a wiper material having a shore hardness of 70 is acceptable to use as a material. The desired material is a urethane or silicone composition. Other materials could be used that are nonreactive to the solvent in use and have the appropriate resilience. The flexible tip 72 includes a wider base portion 74 received within the bore 76 of an insert 78 formed somewhat similar to a collet, secured to the rotary pad print head 64. The base 74 can be retained within the core 76 by a frictional fit.

In one embodiment, FIG. 13, the flexible wiper tip includes a V-notch 82 on the end portion. The notch 82 receives solvent from the gravure roll 68. The solvent is held captive within the V-notch and on the edge of the tip, depending on the size of the V-notch, by the minimal surface tension of the solvent. The size of the notch varies, but in one proposed design, the notch may range from 0.010 to 0.030 inches at the widest portion. These design parameters vary depending on particular labeling needs.

The rotary pad print head 64 and gravure roll 66 rotate synchronously with each other in a position adjacent to each other so that the flexible wiper tip 72 engages the gravure roll as both rotate, transferring solvent from the indentations 68 of the gravure roll into the V-notch 82 of the flexible wiper tip 72. The rotary pad print head 64 is positioned adjacent the label transport drum 32 and is timed in rotation therewith such that the flexible tip 72 is deflected against the area adjacent the trailing edge of the label. The flexible tip having the V-notch 82 therein, and the synchronous rotation between the rotary pad print head and the label transport drum provides a surprising, effective and beneficial result of evenly applying solvent onto the area adjacent the trailing edge of the label without solvent motfling and streaking. As shown in FIG. 14, the solvent is applied in the area adjacent the leading edge 11*b*. The pattern is indicated at 84. Prior art straight solvent pad printing such as from a gravure roll would provide only an uneven application of solvent, causing mottling of the solvent. Static wiping has been found to be a poor solvent application method, causing sircaking of the solvent.

A surprising and beneficial solvent application on the label has also been found to be related to a speed differential between the surface speed of the rotary pad print head 64 and wiper tip 72 and the surface speed of the label transport drum 32. A slower surface speed of the rotary pad print head 64 relative to the label transport drum 32 deflects the tip so that solvent is evenly applied onto the area adjacent the trailing edge of the label. It has been found that a narrowing, tapered tip without a groove provides adequate solvent application without the need for the V-notch when the peripheral surface speed of the rotary pad print head is slower than the surface speed of the drum. FIG. 13 illustrates such an embodiment with the tip being designated in prime notation. The lower speed differential between the narrowed tip 72 and label transport from 32 provides for tip deflection against the label and results in surprising, beneficial application, evenly applying solvent without streaking and mottling. The narrowing, tapered tip configuration showing in FIG. 13 is advantageous because the solvent application is enhanced with the speed differential between the tip 72 and label transport drum 32. In one embodiment, the tip is narrowed to an end of about 0.020 inches. As in the previous embodiment, the tip dimensions vary depending on labeling needs.

In this embodiment using speed differential between the rotary pad print head and the label transport drum, a servomotor (indicated at block 65 by dotted lines of FIG. 7) is operatively connected to the rotary pad print head. An encoder 65*a* is operatively connected to the rotary pad print head. An encoder 65*a* is operatively connected to the servomotor 65 and label transport drum. The servomotor 65 and encoder 65*a* together maintain a desired speed differential between the print head and the label transport drum. It is expected that a speed differential between three and fifteen percent will provide the desired solvent application. The servomotor or encoder also may be connected to the gravure roll if it is found desirable to have the gravure roll rotate in close synchronism with the rotary pad print head.

A solvent reservoir 90 provides solvent to the gravure roll 66 through means of a solvent metering pump 92, fluid delivery line 92, solvent distribution shoe 94 and solvent return line 96. The preferred solvent is an organic solvent that reacts with the label material.

Figure 8:
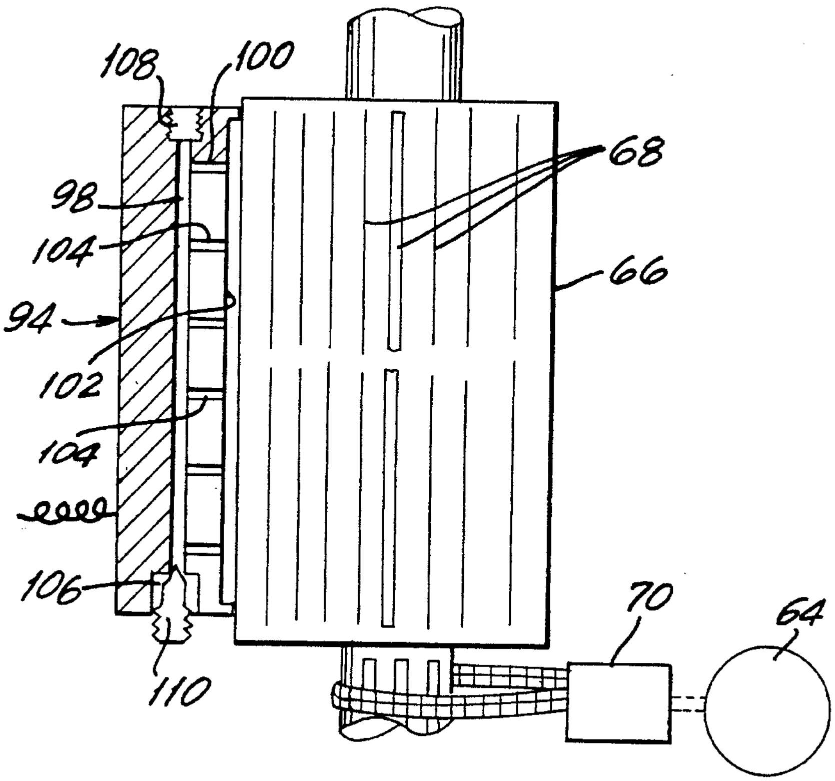
FIG. 8 is a highly schematic plan view of the solvent distribution shoe and its positional relationship to the gravure roll.
Figure 9:
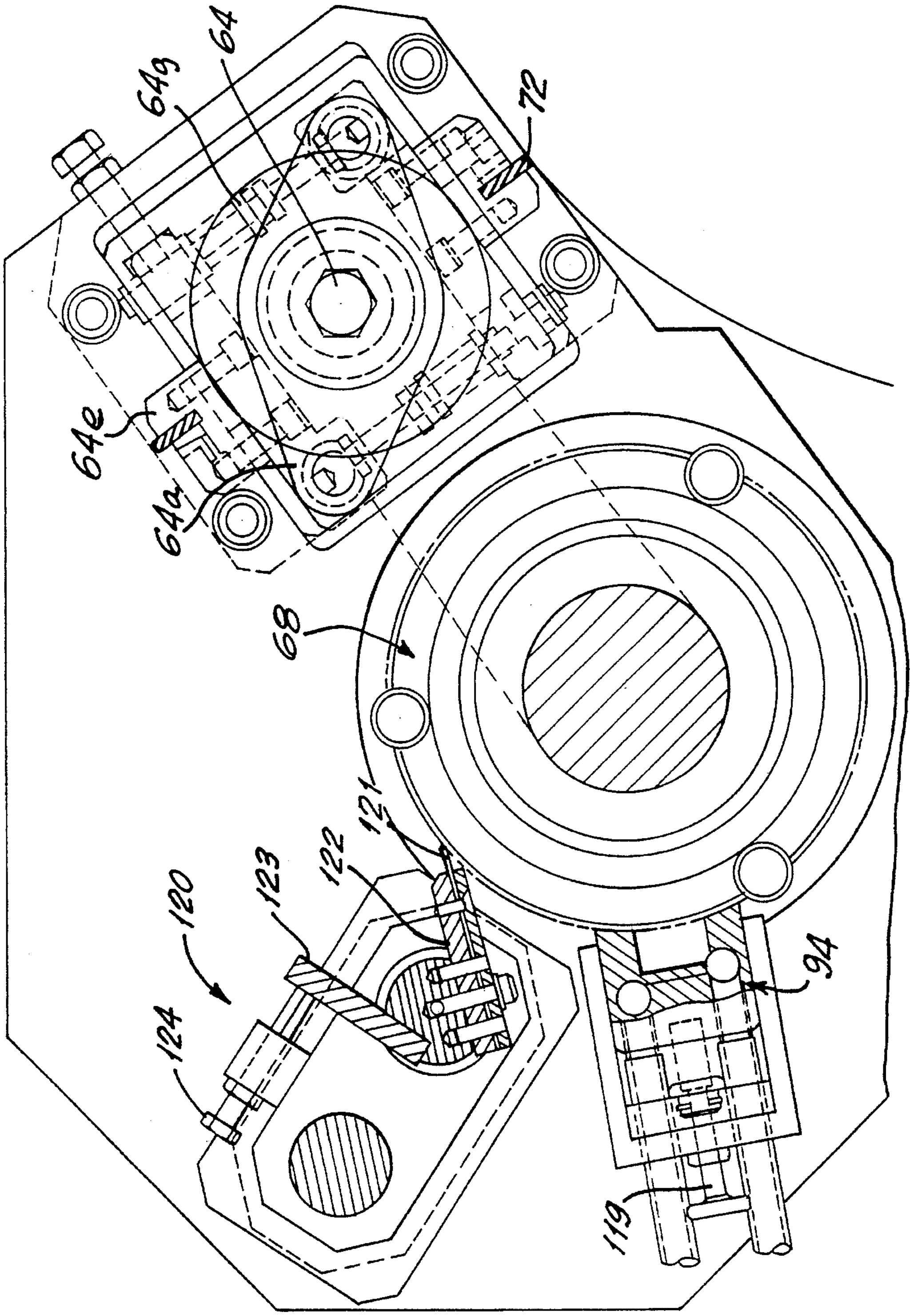
FIG. 9 is a detailed, partial sectional view of the solvent distribution shoe, the gravure roll, and the rotary pad print head.

As shown in detail in FIGS. 5 and 8, and partially in FIG. 9, the solvent distribution shoe 94 is formed from a substantially rigid block such as Teflon, having an annulus 98 extending longitudinally through the block. The block includes an arcuate configured solvent delivery surface 102 formed similar to the arcuate curve of the gravure roll 66. Solvent delivery orifices 104 communicate between the annulus 98 and the arcuate configured surface 102 to provide a solvent delivery system to the surface.

The annulus 98 has a solvent feed opening 106 in which solvent is fed into the annulus 98, and a solvent discharge opening 108 through which any excess solvent not passing into the orifices 104 pass from the solvent distribution shoe 94 back to the solvent reservoir 90. The solvent return line 96 has a pressure generating valve 96*a*, acting as a restrictor to solvent flow. The solvent feed opening 106 is dimensioned to form a metering orifice for controlling the amount of solvent fed into the annulus 98. In the illustrated embodiment showing in FIG. 8, the metering orifice includes a tapered needle valve 110 threadably received within the solvent feed opening 106.

The solvent distribution shoe 94 is mounted to the frame of a housing 118, enclosing the gravure roll, solvent distribution shoe and rotary pad print head 64. As shown schematically in FIG. 7, the solvent distribution shoe 94 is biased by a spring assembly 116 secured to the housing 118 to provide a biasing force to the solvent distribution shoe against the gravure roll 68. FIG. 9 illustrates a more detailed structural representation of the solvent distribution shoe mounting systems and shows a preferred, threaded adjustment screw 119 used for adjusting the position of the shoe.

A spring biased doctor blade, indicated generally at 120, is mounted on the frame of the housing 118 and includes an end portion wiping the gravure roll of excess solvent applied upon the surface. As shown in greater detail in FIG. 9, the doctor blade 120 includes a blade member 121 mounted on a doctor blade support arm 122, mounted in turn on a rocker assembly 123. An adjustment blot 124 provides for manual adjustment of the position of the doctor blade member 121.

The solvent reservoir 90 also is enclosed within a housing 126. A filler opening 127 and filler inlet valve 127*a* are mounted on the top surface of the solvent reservoir 90, the filler opening 127 is removed to permit filling. An emergency solvent return line 128 connects the bottom portion of the gravure roll housing 118 with the bottom portion of the solvent reservoir housing 26. In the event the spring 116 breaks or the Teflon solvent distribution shoe 94 shatters, discharging solvent through the housing 118, solvent is returned via the line 128 into the solvent reservoir 90.

Figure 6:
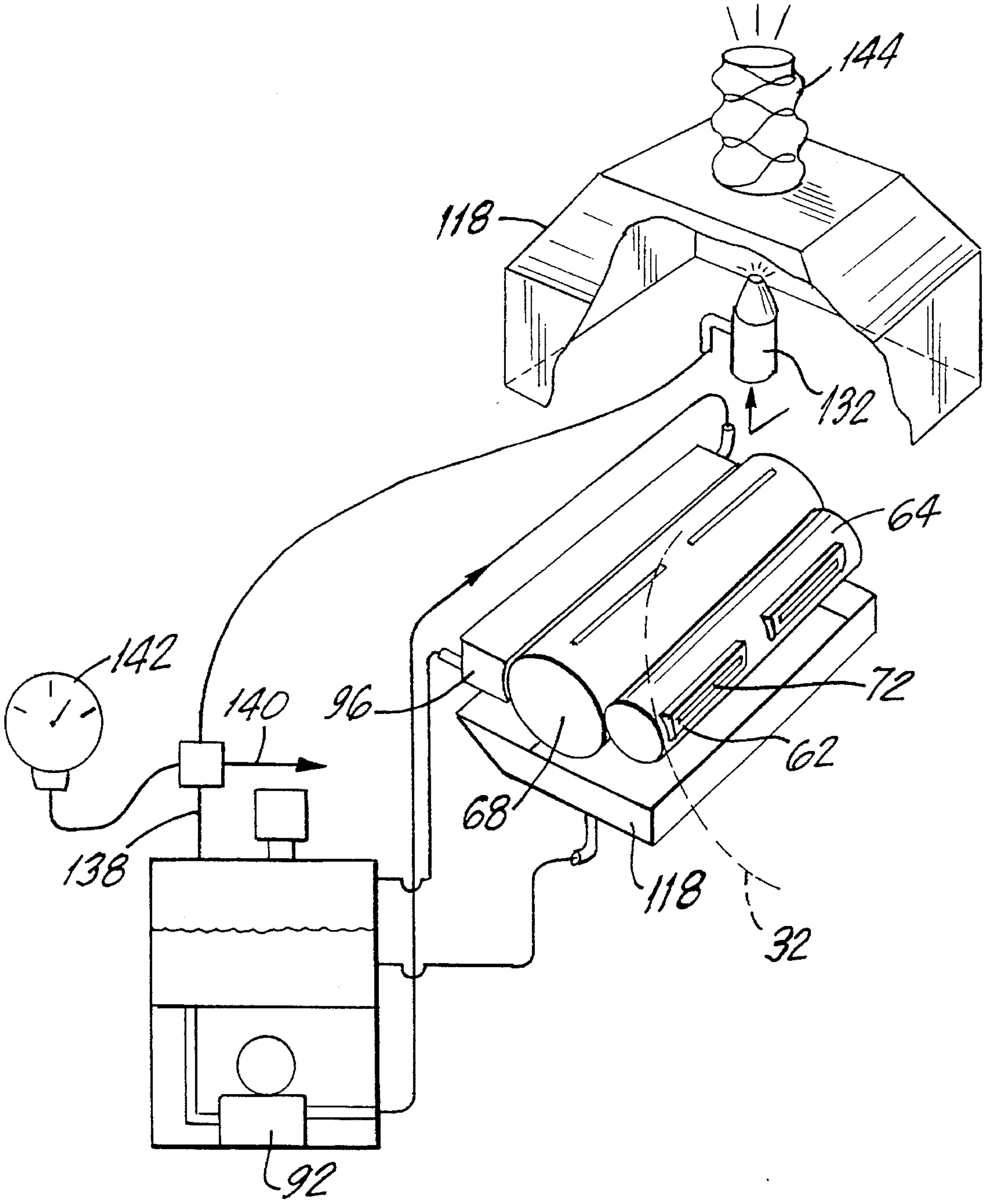
FIG. 6 is a schematic, partial isometric view of the solvent application and delivery system.
Figure 7:
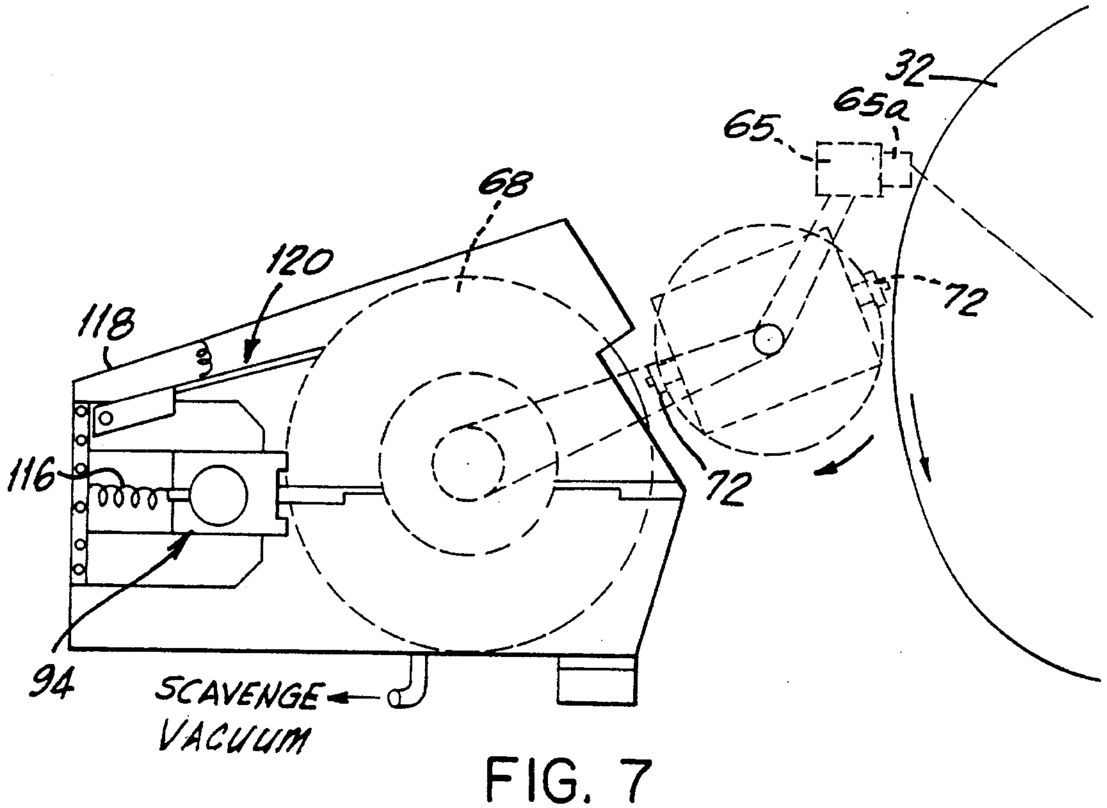
FIG. 7 is a highly schematic illustration of the solvent distribution shoe, gravure roll, and rotary pad print head.

A vacuum system, indicated generally at 130, provides a solvent vapor return system and scavenging capability for the solvent delivery system. As shown in FIGS. 5 and 6, a source of compressed air discharges air through a venturi vacuum pump 132. Preferably, as shown in FIG. 6, the venturi vacuum pump is positioned within the housing 118. However, the pump can be positioned in any convenient location where it can exhaust within the solvent vapor extraction system.

A main vacuum line 134 extends off the venturi vacuum pump 132 and interconnects through manifold 136 into split vacuum lines 138 and 140. Line 138 extends into the top portion of the fluid reservoir housing 126 and provides a vacuum head space. Line 140 extends into the gravure roll and rotary pad print head housing 118 and draws solvent vapor out of the housing. A suitable vacuum gauge 142 is connected to the manifold 136 to provide a measurement of the amount of vacuum produced by the venturi vacuum pump 132. The compressed air discharged from the venturi vacuum pump 132 is discharged through duct work 144 extending from housing 118 (FIG. 6).

The described solvent delivery system using the gravure roll, rotary pad print head, and the flexible wiper tip also may be used as an adhesive applicator.

The label continues to move with the label transport drum 32 after the cold adhesive is applied onto the leading edge of the label and the solvent is applied onto the area adjacent the trailing edge of the label. The articles A to be labeled are presented into tangential spinning engagement horizontally to the surface of the label transport drum before transferring the label onto the drum.

Figure 11:
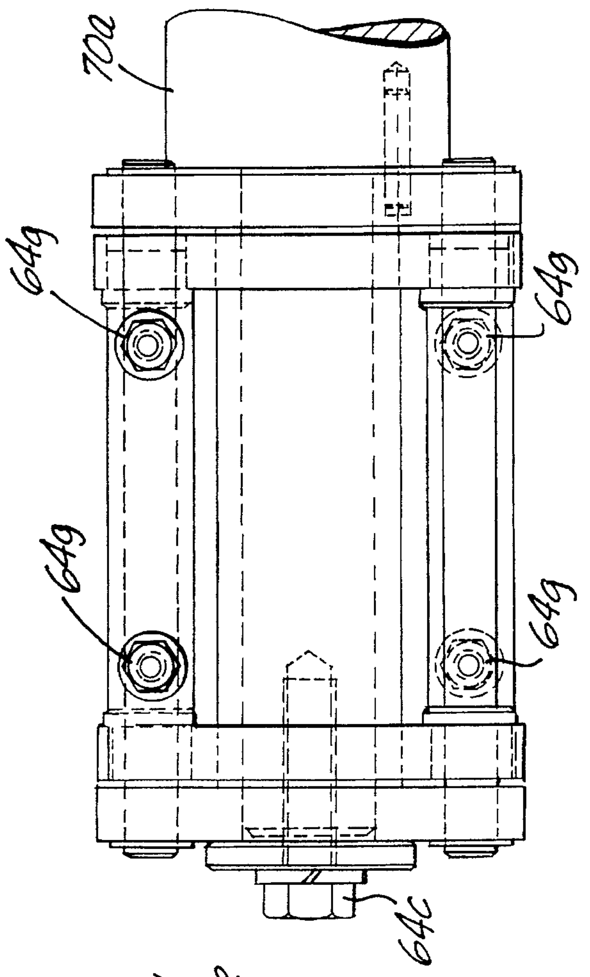
FIG. 11 is a detailed plan view of the rotary pad print head.

Referring now to FIGS. 10 and 11, schematic details of one proposed construction of the rotary pad print head are shown. The rotary pad print head includes a support flange bracket 64*a* and wiper frame assembly 64*b* forming a cafe-like assembly. A large threaded bolt 64*c* receives the support flange bracket 64*a* to the shaft 70*a* of the common drive and transmission mechanism for both the gravure roll and the rotary pad print head. A wiper support 64*d* is secured by bolts 64*e* to opposing arms 64*f* of the frame assembly 64*b*. The insert 78 is secured by suitable means for the support 64*d* opposing arms 64*f* are secured to each other by bolt and fastener assemblies 64*g* that are adjustable to ensure that the assembly is balanced.

As shown in greater detail in FIG. 3, the articles A are initially conveyed on a flat belt conveyor 150 and into a star transfer wheel 152. The star wheel 152 rotates, transferring the articles A one at a time into an inclined belt conveyor 154 and to provide a sufficient head of articles for process flow control. The articles are fed in a double row, side-by-side manner, each pair of articles having complementary pairs of labels (FIG. 16). The belt conveyor transports the articles A into an inclined gravity chute 156 having a serpentine channel 158 for slowing the movement of the articles A downward from the height of the inclined belt conveyor 154. Articles A then are fed into a serpentine timing wheel assembly, indicated generally at 160, where a tangential, rotative movement is imparted to the articles A. The articles A traverse around the serpentine timing wheel assembly 160 and into tangential spinning engagement with the surface of the drum. The articles A traverse along the drum surface, held of the surface by a retaining shield 162. The drum rotates faster than the spinning articles, imparting and maintaining a spin to the articles A.

Figure 2:
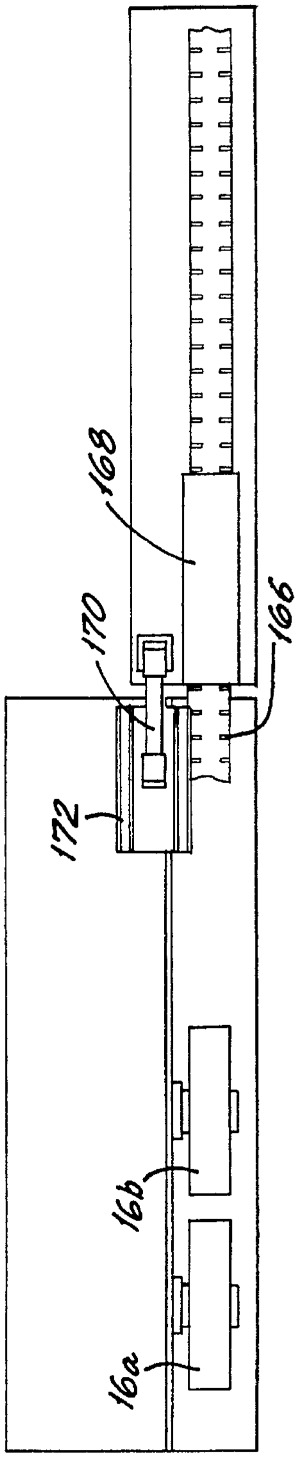
FIG. 2 is a plan view of the apparatus looking in the direction of arrow 2 of FIG. 1.

Because the drum is rotating faster than the movement of articles A along the retaining shield 162, the articles contact the adhesive positioned adjacent the leading edge of the label. The adhesive provides a tacking agent to retain the label onto the article A. Continued spinning rotation of the article A wraps the label around the article A. The solvent positioned on the area adjacent the trailing edge provides a welding agent to the label at the point where the trailing edge portion overlaps the leading edge portion (FIG. 15). The article A then progresses around a second serpentine timing wheel assembly 164 and then onto a flighted bed belt conveyor 166. The conveyor transports the articles into an oven 168, where the articles are heated and the film heat shrunk around the articles. A manual swing arm assembly 170 supports a modular control unit 172 (FIG. 2) providing access for a user to the machine controls.

Figure 4:
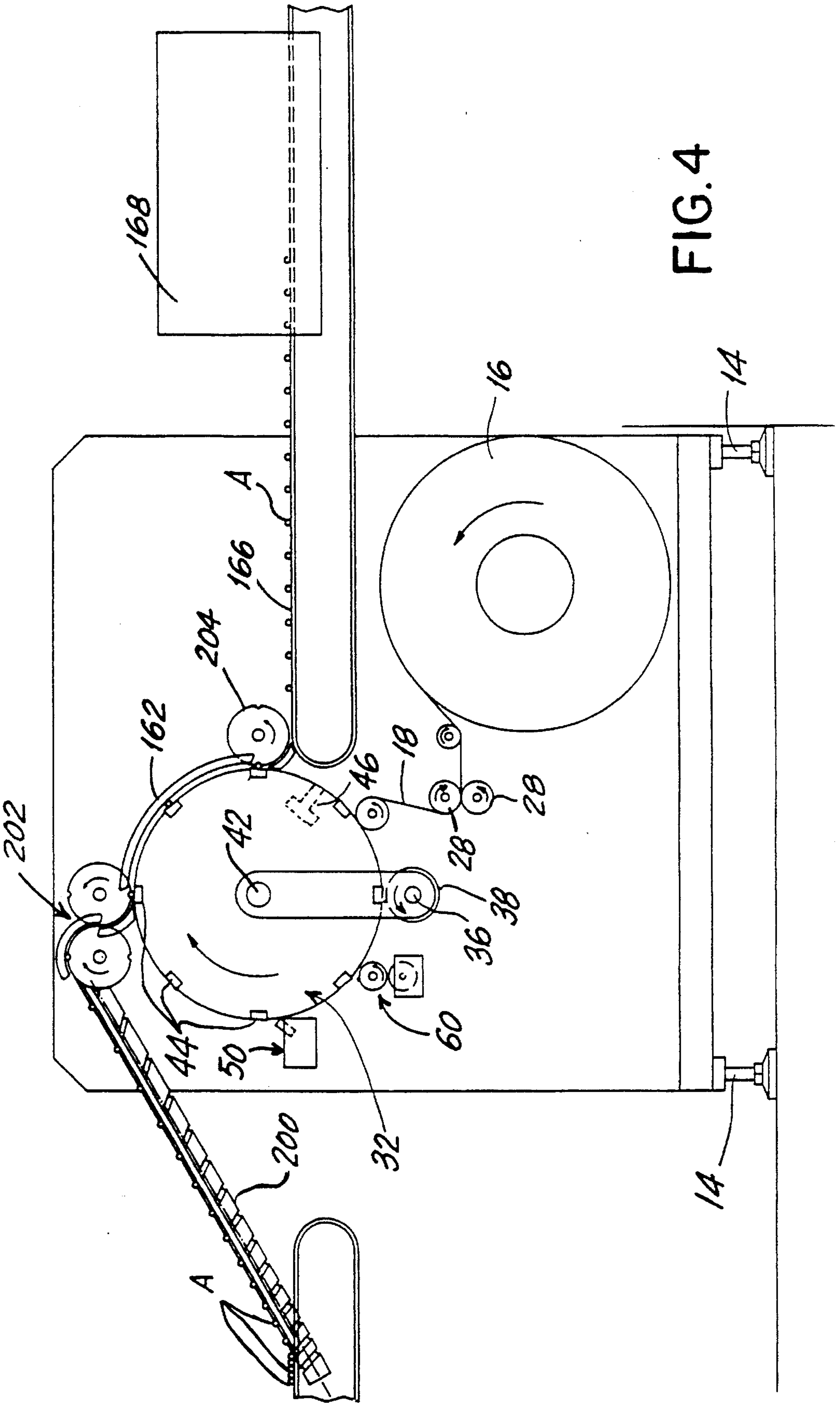
FIG. 4 is an enlarged, side elevation view of another embodiment of the present apparatus having a different article conveyor system.

FIG. 4 illustrates an alternative embodiment of the overall article A conveyance system and label supply system where only one label supply roll is used. The use of only one label supply roll is a more simple construction than the other embodiments shown in FIGS. 1–3. The illustrated embodiment also includes a less complex serpentine article transfer and conveyance system. An upwardly, including conveyor 200 delivers articles A into a dual transfer roll assembly 202, around the drum, into a transfer wheel 204 similar to a star wheel. The adhesive applicator and solvent applicator otherwise are the same construction as described before.

METHOD OF OPERATION

In operation a strip 18 of label is fed from the label supply roll 16*a*, through the dancer roll assembly 22 and into engagement with the label transport drum 32. The strip is cut and retained to the drum by the label retaining means 46. An adhesive is applied by the adhesive applicator 50 onto the area adjacent the leading edge 11*a*. After adhesive application, the solvent is applied by the solvent delivery system 60 onto the area adjacent the trailing edge 11*b*.

Articles are transferred along the serpentine transfer wheel assembly 160 into engagement with the drum and along the retaining shield 162. Because the drum rotates faster than the articles moved between the retaining shield 162 and the drum 32, the advancing leading edge of the label having the adhesive applied adjacent thereto engages the article. The adhesive forms a tack weld, securing the label directly to the article. Continued rotation of the drum maintains rotation of the article, wrapping the article with the label. The labeled article then is transferred through the second timing wheel assembly 164 onto the conveyor, where it is transferred into the oven 168, heat shrinking the label onto the article A.

During operation, the rotary pad print head may be pivotally moved toward or away from the drum to change the tip deflection and change the wiping characteristics of the tip against the label. Additionally, in the embodiment having the narrowed, tapering wipe tip without a V-notch, speed of the rotary pad print head may be changed relative to speed of the drum 32, changing tip deflection against label.

It should be understood that the foregoing description of the invention is intended merely to be illustrative thereof, and that other embodiments, modifications and equivalents may be apparent to those skilled in the art without departing from its spirit.

That which is claimed is:

1. A small cylindrical article in combination with a thin layer heat shrinkable film material applied thereto comprising a cylindrical body having a longitudinal axis and a smooth outer peripheral surface, said body having a diameter less than about 1.75 inches and having at least one opposing end portion forming a shoulder, a label formed from a heat shrinkable polymer film material, said label having a thickness less than about 0.0035 inches, and leading and trailing edges, said leading edge aligned longitudinally with the longitudinal axis of the cylindrical axis of the cylindrical body and adhered thereto by an adhesive retained on the leading edge of the label, said label being wrapped around said cylindrical body so that the trailing edge overlaps the leading edge of said label, the major portion of the label wrapped around the cylindrical article being free of adhesive and substantially unshrunk and tightly wrapped around the article, said trailing edge being bonded to the leading edge by a solvent that had been evenly applied onto an area adjacent the trailing edge of the label to form a solvent seal bond thereat to retain the trailing edge of the label to the leading edge, and said label includes at least one end portion which is heat shrunk over said shoulder, wherein the label includes a medial portion covered with printed matter and the area adjacent the trailing edge is substantially void of printed matter.

2. An article as claimed in claim 1 wherein the opposing end portion is substantially planar and forms a shoulder at the intersection of the outer peripheral surface and the end portion.

3. An article as claimed in claim 1 wherein the cylindrical body includes opposing, substantially planar end portions forming opposing shoulders at the intersection of the outer peripheral surface and the end portions.

4. A battery in combination with a thin layer heat shrinkable film material applied thereto comprising a cylindrical dry cell having a longitudinal axis and a smooth outer peripheral surface, said dry cell having a diameter less than 1.75 inches and having at least one opposing end portion forming a shoulder, a label formed from a heat shrinkable polymer film material, said label having a thickness less than about 0.0035 inches, and leading and trailing edges, said leading edge aligned longitudinally with the longitudinal axis of the dry cell and adhered thereto by an adhesive retained on the leading edge of the label, said label being wrapped around said dry cell so that the trailing edge overlaps the leading edge of said label, the major portion of the label wrapped around the cylindrical dry cell being free of adhesive and substantially unshrunk and tightly wrapped around the dry cell, said trailing edge being bonded to the leading edge by a solvent that had been evenly applied onto an area adjacent the trailing edge of the label to form a solvent seal bond thereat to rain the trailing edge of the label to the leading edge, and said label includes at least one end portion which is heat shrunk over said shoulder, wherein the label includes a medial portion covered with printed matter and ink, and the area adjacent the trailing edge is substantially void of printed matter and ink.

5. A battery as claimed in claim 4 wherein the opposing end portion is substantially planar and forms a shoulder at the intersection of the outer peripheral surface and the end portion.

6. A battery as claimed in claim 4 wherein the cylindrical body includes opposing, substantially planar end portions forming opposing shoulders at the intersection of the outer peripheral surface and the end portions.

* * * * *

UNITED STATES PATENT AND TRADEMARK OFFICE

CERTIFICATE OF CORRECTION

PATENT NO. : 5,512,352

DATED : April 30, 1996

INVENTOR(S) : Haig Varjian

It is certified that error appears in the above-indentified patent and that said Letters Patent is hereby corrected as shown below:

On the title page: Item [75]

At number [75], change "Varjian Haig" to -- Haig Varjian --.

At column 14, line 47, delete "rain" and insert therefor -- retain --.

Signed and Sealed this

Twenty-fourth Day of September, 1996

*Attest:*

BRUCE LEHMAN

*Attesting Officer* *Commissioner of Patents and Trademarks*